(12) United States Patent
Weist et al.

(10) Patent No.: US 8,337,674 B2
(45) Date of Patent: Dec. 25, 2012

(54) OZONE PRODUCTION BY PRESSURE SWING ADSORPTION USING A NOBLE GAS ADDITIVE

(75) Inventors: Annemarie Ott Weist, Macungie, PA (US); Shailesh Pradeep Gangoli, Glen Gardner, NJ (US); Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 964 days.

(21) Appl. No.: 12/358,310

(22) Filed: Jan. 23, 2009

(65) Prior Publication Data

US 2010/0187092 A1    Jul. 29, 2010

(51) Int. Cl.
   *C01B 13/10*    (2006.01)
(52) U.S. Cl. .......... 204/176; 422/186.07; 95/96; 95/97; 95/98; 95/138
(58) Field of Classification Search .......... 204/176; 422/186.07; 95/96–98, 138
   See application file for complete search history.

(56) References Cited

U.S. PATENT DOCUMENTS

| 5,370,846 A | 12/1994 | Yokomi et al. |
| 5,520,887 A * | 5/1996 | Shimizu et al. .......... 422/186.08 |
| 5,578,213 A * | 11/1996 | Miller et al. .......... 210/641 |
| 5,810,910 A | 9/1998 | Ludwig et al. |
| 5,810,978 A | 9/1998 | Nakatsuka et al. |
| 5,846,298 A | 12/1998 | Weist, Jr. |
| 6,030,598 A | 2/2000 | Topham et al. |
| 7,382,087 B2 | 6/2008 | Tabata et al. |
| 2001/0042691 A1 | 11/2001 | Izumi et al. |

FOREIGN PATENT DOCUMENTS

| DE | 196 48 514 A1 | 5/1997 |
| EP | 0 884 275 A2 | 12/1998 |
| EP | 1 359 120 A | 11/2003 |
| JP | 06-021010 B | 3/1994 |
| WO | 2005/080263 | 9/2005 |

OTHER PUBLICATIONS

Weist, Annemarie Ott, et al; U.S. Appl. No. 12/029,695, filed Feb. 12, 2008; Ozone Production by Pressure Swing Adsorption Using a Protective Adsorbed Component.

* cited by examiner

*Primary Examiner* — Xiuyu Tai
(74) *Attorney, Agent, or Firm* — Anne B. Kiernan

(57) ABSTRACT

Helium is introduced as an additive to any of the oxygen streams introduced into an ozone generator, such as a dielectric discharge (cold plasma) ozone generator, where the effluent of the generator is directed to an adsorption process for separating the ozone from the oxygen. Also disclosed is an improved PSA cycle, which is designed to reduce the amount of make-up helium and oxygen required to sustain the ozone generation and recovery process.

18 Claims, 2 Drawing Sheets

Figure 2

| Test # | Feed Gas Composition (volume basis) | | | Effluent Ozone Concentration (volume basis) | Specific Power (Wh/gO3) |
|---|---|---|---|---|---|
| | Helium | Nitrogen | Oxygen | | |
| 1 | 0.0% | 0.0% | 100.0% | 5.2% | 10.8 |
| 2 | 0.0% | 3.1% | 96.9% | 5.5% | 10 |
| 3 | 3.1% | 0.0% | 96.9% | 5.3% | 9.5 |

Figure 3

| | STEP 1 | STEP 2 | STEP 3 | STEP 4 | STEP 5 | STEP 6 | STEP 7 | STEP 8 | STEP 9 |
|---|---|---|---|---|---|---|---|---|---|
| C1 | O2/O3 FEED | | | PRODUCT RINSE | O2/O3 FEED | | AIR SWEEP | | OXYGEN RINSE |
| C2 | AIR SWEEP | | OXYGEN RINSE | AIR SWEEP | | | PRODUCT RINSE | O2/O3 FEED | |
| C3 | PRODUCT RINSE | O2/O3 FEED | | | | OXYGEN RINSE | | AIR SWEEP | |

OZONE PRODUCTION BY PRESSURE SWING ADSORPTION USING A NOBLE GAS ADDITIVE

BACKGROUND OF THE INVENTION

Ozone is a reactive triatomic allotrope of oxygen that has applications in chemical production, disinfection, drinking water treatment, air purification, bleaching of fabrics and wood pulp, wastewater treatment, and food processing. Most of the ozone used in these applications is produced by corona discharge systems using air or high-purity oxygen as the feed gas. Ozone also may be produced from air or oxygen by the action of ultraviolet light or by cold plasma generators.

High purity oxygen is used as the ozone generator feed gas in most large industrial applications of ozone. The conversion of oxygen into ozone in commercial corona discharge generators is typically between 4 and 13%, and in certain applications the resulting oxygen-ozone mixture is provided as product directly to the downstream user without further treatment. Because the cost of the unreacted oxygen is a major part of the ozone system operating cost, it is desirable in many situations to recover the oxygen from the oxygen-ozone mixture for recycling to the ozone generator. This can be accomplished, for example, by pressure swing adsorption (PSA) in which ozone is selectively adsorbed from the ozone generator outlet stream, and the recovered ozone-depleted oxygen is recycled to the ozone generator. The adsorbed ozone is desorbed by a sweep gas such as air or nitrogen, and the mixture of ozone and sweep gas is provided as product to the downstream user.

Ozone-oxygen PSA systems often use zeolite adsorbents for the selective adsorption of ozone from oxygen. It is known that zeolite adsorbents can promote the decomposition of ozone, and the degree of ozone decomposition can adversely affect ozone cost and increase the operating cost of the ozone-consuming process. The degree of ozone decomposition can be reduced by using a zeolite that contains pre-adsorbed components such as water, carbon dioxide, argon, or sulfur hexafluoride as described in U.S. Pat. No. 5,810,910. These components, which are non-reactive with ozone, are adsorbed on the adsorbent prior to ozone adsorption.

In ozone-oxygen PSA systems using cold plasma generators for the generation of ozone, nitrogen is often added to the oxygen feed gas for the purpose of stabilizing the plasma discharge. Unfortunately, the addition of nitrogen to the generation process often results in the formation of $NO_x$, which can have several detrimental effects on the ozone-oxygen PSA system. In the presence of moisture, $NO_x$ will form nitric acid, which is highly corrosive and can shorten the service life of system components including, for example, ozone generator cathodes. In addition, $NO_x$ adsorbs onto many types of adsorbents used in oxygen-ozone PSA systems and can build up if the volume of gas used in a "sweep step" (to remove ozone from the adsorbent) is not sufficient to also remove adsorbed $NO_x$. Adsorbed $NO_x$ also catalyzes ozone decomposition, which reduces the amount of ozone that can be recovered in a produced gas stream.

There is a need for an alternative means for improving the stability and efficiency for cold plasma ozone generation without forming undesirable by-products, such as $NO_x$.

BRIEF SUMMARY OF THE INVENTION

In one respect, the invention comprises a method comprising: (a) feeding a feed gas mixture from a feed gas line through a dielectric plasma ozone generator, the feed gas line being connected to an oxygen supply and a helium supply, the oxygen supply comprising at least 90% oxygen, the feed gas mixture comprising at least 1% helium; and (b) producing a generator effluent comprising ozone.

In another respect, the invention comprises a method comprising:
(a) feeding a feed gas mixture from a feed gas line through a dielectric plasma ozone generator, the feed gas line being connected to an oxygen supply and a helium supply, the oxygen supply comprising at least 90% oxygen, the feed gas mixture comprising at least 1% of a noble gas; and
(b) producing a generator effluent comprising at least 2% ozone;
(c) performing an adsorption cycle which comprises repeatedly performing the following steps, in sequence, in each of the at least one adsorber vessel, each of the at least one adsorber vessel including an adsorbent having a greater adsorption affinity for ozone than for oxygen or helium:
  (i) feeding the generator effluent through the adsorber vessel and routing gas that exits the adsorber vessel to a recovery line, the recovery line being in fluid communication with the feed gas line;
  (ii) feeding a purge gas through the adsorber vessel and routing gas that exits the adsorber vessel through the recovery line; and
  (iii) feeding a purge gas through the adsorber vessel and withdrawing from the adsorber vessel a product gas comprising the purge gas and ozone.

In yet another respect, the invention comprises an apparatus comprising: an ozone generator; a feed gas line adapted to supply a feed gas mixture to the ozone generator; an oxygen supply source capable of supplying gas consisting of at least 90% oxygen to the feed gas line; a helium supply source that is capable of supplying helium to the feed gas line; and a controller that is operationally configured to control the flow of helium from the helium supply source to the feed gas line so that the feed gas mixture comprises at least 1% helium.

BRIEF DESCRIPTION OF SEVERAL VIEWS OF THE DRAWINGS

FIG. 2 is a table showing data from three ozone generation tests using different feed gas mixture compositions; and FIG. 3 is a chart showing a system cycle for the PSA ozone system shown in FIG. 1.

DETAILED DESCRIPTION OF THE EMBODIMENTS OF THE INVENTION

Figure 1:
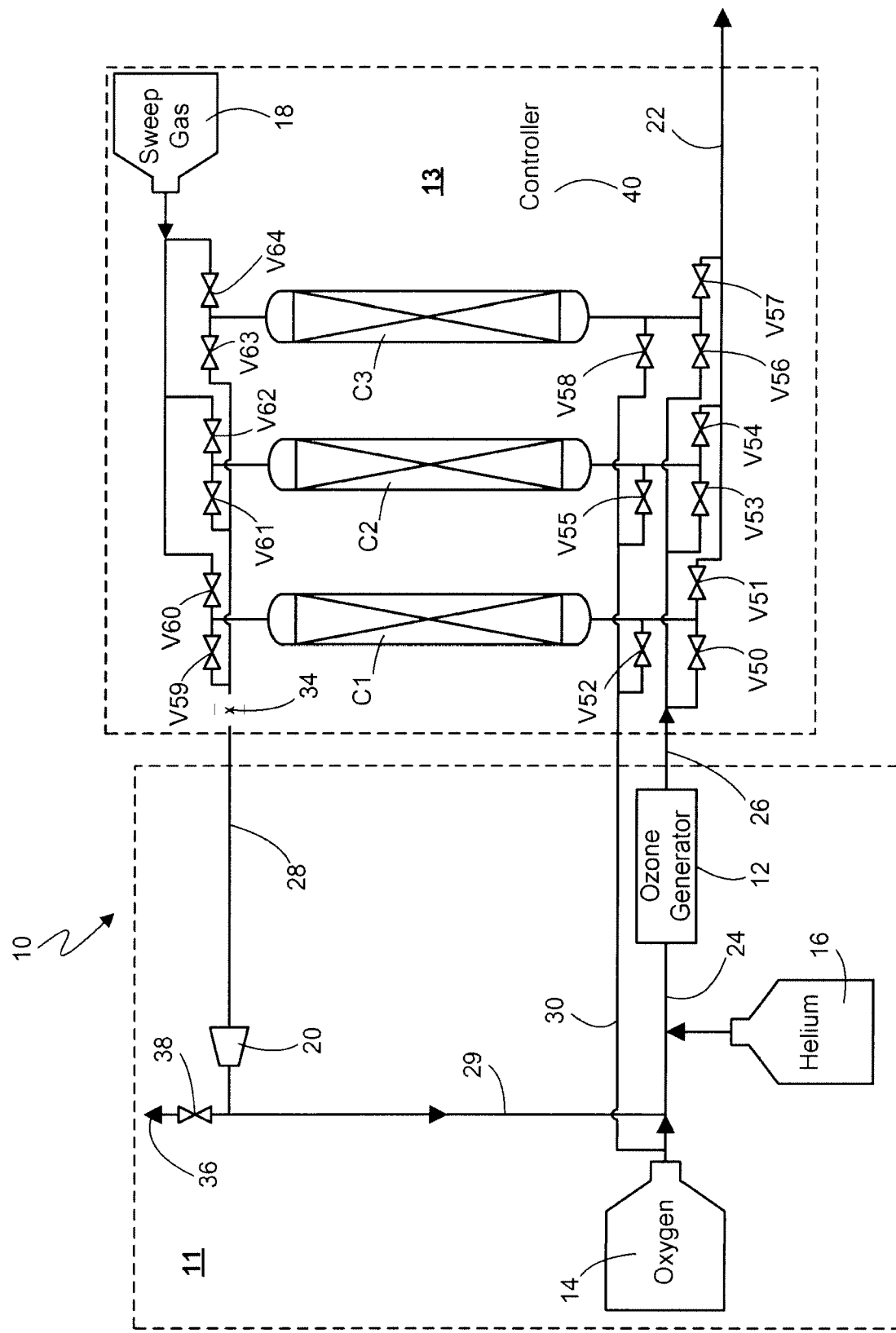
FIG. 1 is a process flow diagram of an embodiment of the present invention.

The present invention comprises the introduction of helium as an additive to any of the oxygen streams introduced into an ozone generator, such as a dielectric discharge (cold plasma) ozone generator, where the effluent of the generator is directed to an adsorption process for separating the ozone from the oxygen. The invention further comprises an improved PSA cycle, which is designed to reduce the amount of make-up helium and oxygen required to sustain the ozone generation and recovery process.

Unless otherwise stated herein, all percentages identified in the specification, drawings and claims should be understood to be on a volume basis.

In the claims, letters are used to identify claimed steps (e.g. (a), (b) and (c)). These letters are used to aid in referring to the method steps and are not intended to indicate the order in which claimed steps are performed, unless and only to the extent that such order is specifically recited in the claims.

Referring to FIG. 1, a PSA ozone system 10 is shown. The system 10 comprises an ozone generating subsystem 11 which generates ozone and an adsorption subsystem 13 which separates ozone from the effluent of the ozone generating process, temporarily stores the ozone, then transports the ozone for use in an industrial process via a product gas line 22.

The ozone generating subsystem 11 generates ozone by introducing a feed gas mixture into an ozone generator 12 via a feed gas line 24. In this embodiment, the ozone generator 12 is a dielectric discharge (cold plasma) ozone generator. The feed gas mixture in feed gas line 24 preferably consists essentially of oxygen and helium. The feed gas line 24 is connected to an oxygen supply 14, which provides air comprising at least 90% oxygen and, more preferably, at least 99% oxygen. The feed gas line 24 is also connected to a helium supply 16, which preferably maintains a helium concentration of at least 1% and, more preferably, 2-5% in the feed gas mixture. The feed gas mixture also includes recycled gas from a recycle line 29. An oxygen concentration of at least 90%, and more preferably at least 95%, is preferably maintained in the feed gas mixture. The typical composition of the recycled gas will be described in greater detail herein. The generator effluent from the ozone generator 12, which flows through line 26, consists essentially of oxygen, helium and ozone. A typical dielectric discharge ozone generator converts about 4-13% of the oxygen in the feed gas into ozone.

In this embodiment, oxygen and helium are supplied via liquified gas tanks. Alternatively, any suitable means of providing reliable supplies of oxygen and helium could be used. An oxygen supply is preferred to ambient air because ambient air contains a lower percentage of oxygen and contains a significant amount of nitrogen. Any suitable means, such as a controller and adjustable valves (not shown), could be used to control flow from the oxygen supply 14, helium supply 16 and recovery line 28 to achieve the desired feed gas mixture composition.

As will be described in greater detail herein, the recovery line 28 is provided to enable the recovery of oxygen and helium, and therefore, reduce the amount of make-up oxygen and helium required to sustain the ozone generating process. The recovery line 28 preferably includes a compressor 20, which compensates for pressure drops across the system 10 and maintains a desired pressure in the recycle line 29, and therefore, in the feed gas line 24.

In this embodiment, the feed gas mixture preferably contains no more than 0.2% nitrogen as it enters the ozone generator 12 (i.e., in the feed gas line 24). In order to monitor nitrogen levels, the recovery line 28 preferably includes a nitrogen sensor 34. The recovery line 28 also optionally includes a vent line 36 having a valve 38, which can be used to vent gas from the recovery line 28 if the nitrogen concentration in the recovery line 28 exceeds preferred levels. As will be described in greater detail herein, the system cycle is also adapted to reduce the amount of nitrogen being introduced into the recovery line 28.

In this embodiment, the adsorption subsystem 13 includes three adsorber vessels C1-C3, each of which contains a similar bed of adsorbent. The adsorbent is preferably adapted to have a greater adsorbing affinity for ozone than for oxygen, nitrogen or helium. Zeolite adsorbents are commonly used. The zeolite adsorbent in this embodiment is preferably selected from the group consisting of chabazite, erionite, mordenite, offretite, ZSM-5, HZSM-5, ZSM-11, ZSM-12, L-zeolite, ferrierite, beta zeolite, Y-type zeolite, and combinations thereof.

A supply of sweep gas 18 is provided. As will be described in greater detail herein, the sweep gas is used to desorb ozone from the adsorber vessels C1-C3 and carry the ozone to the industrial process in which is it ultimately used. The sweep gas is preferably ambient air, which has been compressed and dried to a dew point of no greater than −70 degrees F. (−57 degrees C.) and, more preferably, to a dew point of no greater than −100 degrees F. (−73 degrees C.). A plurality of valves V50 through V64 and gas lines are provided and are used to control the flow of gas through each of the adsorber vessels C1-C3 and to direct the effluent from each of the adsorber vessels C1-C3 as desired in each of the process steps described herein.

FIG. 2 is a table showing the results of tests performed to confirm that the addition of helium to the feed gas mixture would provide a power savings and would not adversely affect ozone generation. The tests were performed using a Wedesco GSO-50 ozone generator. For all three tests, the feed gas flow rate to the ozone generator was set at 18 standard liters per minute (slpm) and the pressure was set at 1.17 bar (gauge). Power draw data for the ozone generator (used to calculate specific power) was measured and averaged over a four minute period. In Test 1, the feed gas mixture consisted of 100% oxygen, with no additives. In Test 2, the feed gas mixture consisted of 96.9% oxygen and 3.1% nitrogen, which resulted in a slightly higher ozone concentration in the effluent and a reduction in specific power of ozone production. In Test 3, the feed gas mixture consisted of 96.9% oxygen and 3.1% helium, which resulted in an ozone concentration in the effluent that was higher than Test 1, but lower than Test 2. Notably, the addition of helium resulted in a lower specific power than Test 1 or Test 2. It should be noted that this was a very small-scale test. It is expected that more significant power-savings will result in larger-scale ozone production.

The following paragraphs describe the four preferred stages of an adsorption cycle for each adsorber vessel C1-C3 in their preferred order. During operation of the system 10, each vessel C1-C3 preferably continuously repeats these stages in their preferred order. In the interest of brevity, each stage is described in relation to adsorber vessel C1, using its associated valves V50-V52 and V59-V60. It should be understood that each stage is performed in a similar manner on adsorber vessels C2, C3, using corresponding valves for each respective adsorber vessel. For example, valves V50 and V59 are open when an ozone feed stage is being conducted in adsorber vessel C1. When the ozone feed stage is being performed in adsorber vessel C2, valves V53 and V61 would be open. It should also be understood that, in the description that follows, the valves that are open during a particular stage in an adsorber vessel are specifically noted. It can be assumed that all other valves associated with that adsorber vessel are closed during the stage being described. Opening and closing of the valves can be accomplished by any suitable means, such as a controller 40. In the interest of simplifying the drawings, connections between the valves and the controller 40 are not shown. An example of a controller used for adsorption cycle step and process flow control is a Programmable Logic Controller (PLC), programmed such as to maintain the desired flows and open or close the valves during each step of the process. Valves around the adsorber vessels may be: electrically-actuated on/off valves; air-actuated on/off with associated solenoid valve; electrically-actuated control valves; and/or air-actuated control valve with associated control solenoid valve.

Ozone Feed

The purpose of an ozone feed stage is to allow the generator effluent in line 26 to flow into an adsorber vessel and allow the ozone to be adsorbed. The ozone feed stage is conducted in adsorber vessel C1 by opening valve V50, which enables the generator effluent in line 26 (consisting essentially of oxygen, helium and ozone) to flow into the adsorber vessel C1. As the generator effluent flows through the adsorber vessel C1, ozone is adsorbed onto the adsorbent. Non-adsorbed components of the generator effluent (primarily oxygen and helium in this embodiment) are preferably recovered by opening valve V59 and allowing the effluent from adsorber vessel C1 to flow into recovery line 28.

Product Rinse

The purpose of a product rinse stage is to reclaim the oxygen and helium remaining in an adsorber vessel following an ozone feed stage and before an air sweep stage is performed on that adsorber vessel. This is accomplished by feeding a purge gas through the adsorber vessel while directing the effluent from the adsorber vessel into the recovery line 28. In this embodiment, the product rinse stage is performed on adsorber vessel C1 by using some of the effluent from another adsorber vessel that is in an air sweep stage (in this case, adsorber vessel C3) as the purge gas. During an air sweep stage in adsorber vessel C3, valves V64 and V57 are open. In order to initiate the product rinse stage in adsorber vessel C1, valves V51 and V59 are opened. Preferably, the product rinse stage should be performed until nitrogen from the purge gas begins to "break through" the upper portion of the adsorber vessel C1, and halted just before substantial amounts of nitrogen enter recycle line 28 (as detected by the nitrogen sensor 34). Alternatively, the sweep gas 18 can be used as the purge gas in this step (valves and piping not shown).

Air Sweep

The purpose of an air sweep stage is to desorb ozone that has been adsorbed during an ozone feed stage and carry ozone-enriched product gas to the product gas line 22, which carries the product gas to the industrial process in which the ozone is ultimately used. In adsorber vessel C1, the air sweep stage is conducted by opening valves V60 and V51, which causes the sweep gas (acting as the purge gas in this stage) to flow through the adsorber vessel C1 and out through the product gas line 22. In this embodiment, the length of the air sweep stage in each adsorber vessel C1-C3 is selected to achieve a desired overall system cycle length, which is discussed in greater detail below.

Oxygen Rinse

The purpose of an oxygen rinse stage is to clear the sweep gas from an adsorber vessel after the air sweep stage so that the sweep gas (which contains significant amounts of nitrogen) is not drawn into the recovery line 28 during the ozone feed stage. In this embodiment, an oxygen rinse stage is performed on adsorber vessel C1 by opening valve V52, which enables oxygen to flow into the adsorber vessel C1 via a bypass line 30. Bypass line 30 preferably connects with the oxygen supply 14 upstream from the recycle line 29 and the helium supply 16 in order to reduce helium loss. Preferably, the oxygen rinse stage is continued until nitrogen has been nearly completely removed from the adsorber vessel C1. If an oxygen rinse stage is too short, an undesirably high concentration of nitrogen will be detected by the nitrogen sensor 34 in the recovery line 28 when the ozone feed stage is initiated and effluent flow is switched to the recovery line 28.

Optionally, all or a portion of the effluent from an adsorber vessel on which the oxygen rinse stage is being performed may be combined with the sweep gas to aid in the ozone recovery of another column. Alternatively, though less preferred, the effluent could be directed to vent (valve and piping not shown) or directed to the product stream 22 (valve and piping configurations not shown).

Referring to FIG. 3, the adsorption cycles of the three adsorber vessels C1-C3 are offset from one another in a manner that enables relatively steady-state operation of the ozone generator 12 and reduces fluctuations in ozone concentration in the product gas. The system cycle consists of nine steps, which are set forth in FIG. 3. During each sequential step, one of the adsorber vessels C1-C3 switches to the next sequential stage in its adsorption cycle. In order to stabilize ozone concentrations in the product gas, it is desirable that at least one of the adsorber vessels C1-C3 be in the air sweep stage during each step of the system cycle.

The overall adsorption cycle time for each of the adsorber vessels C1-C3 is preferably selected to strike a balance between ozone concentration in the product gas and oxygen and helium savings. In relative terms, a longer adsorption cycle time will result in a greater recovery of oxygen and helium for recycle, but at the expense of lower ozone concentration in the product stream. Conversely, a short adsorption cycle time will result in lower oxygen and helium recovery, but will result in a higher ozone concentration in the product gas.

In alternate embodiments, other additives (such as other noble gases, for example) could be introduced into the feed gas mixture instead of helium. In addition, the ozone generating subsystem 11 could be used with other types of adsorption subsystems, such as a vacuum-swing adsorption system, for example. Finally, the adsorption subsystem 13 could include any number of adsorber vessels.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method of producing an ozone-containing gas comprising:
   (a) feeding a feed gas mixture from a feed gas line through a dielectric plasma ozone generator, the feed gas line being connected to an oxygen supply and a helium supply, the oxygen supply comprising at least 90% oxygen,
   (b) producing a generator effluent comprising ozone from the dielectric plasma ozone generator;
   (c) feeding the generator effluent through a first adsorber vessel containing an adsorbent having a greater adsorption affinity for ozone than for oxygen or helium and routing gas that exits the first adsorber vessel to a recovery line, the recovery line being in fluid communication with the feed gas line;
   (d) feeding a sweep gas through the first adsorber vessel and withdrawing from the first adsorber vessel a product gas comprising the sweep gas and ozone; and
   (f) feeding a rinse gas through the first adsorber vessel, the rinse gas consisting of gas from the oxygen supply that is delivered through a bypass line that is not connected to the helium supply and bypasses the dielectric plasma ozone generator; and
   (g) monitoring a nitrogen level in the recovery line using a nitrogen sensor.

2. The method of claim 1, further comprising:
   (e) feeding the sweep gas and/or a portion of the effluent from another adsorber vessel that is performing step (d)

through the first adsorber vessel and routing gas that exits the first adsorber vessel to the recovery line.

3. The method of claim 2, further comprising:
performing step (e) after step (c) and before step (d).

4. The method of claim 1, wherein step (f) further comprises routing gas that exits the first adsorber vessel through a line other than the recovery line.

5. The method of claim 4, further comprising:
performing step (f) after step (d).

6. The method of claim 5, further comprising performing an adsorber cycle consisting of repeating steps (c) through (f) in the sequence specified in claims 3 and 5.

7. The method of claim 1, wherein the feed gas mixture comprises 2%-5% helium.

8. The method of claim 1, wherein the purge gas consists of ambient air having a dew point that is no greater than −57 degrees C.

9. The method of claim 4, wherein step (f) further comprises feeding gas that exits the first adsorber vessel into another adsorber vessel that is performing step (d).

10. The method of claim 1, further comprising:
(h) venting gas from the recovery line if the nitrogren level measured by the nitrogen sensor exceedS a preferred level.

11. The method of claim 1, wherein step (f) further comprises routing the effluent from the first adsorber vessel to a recovery line that is in fluid communication with the feed gas line and the method further comprises:
(h) terminating step (f) based the monitored nitrogen level of step (g).

12. The method of claim 2, wherein step (e) comprises feeding the effluent from another adsorber vessel that is performing step (d) through the first adsorber vessel and routing gas that exits the first adsorber vessel to the recovery line.

13. The method of claim 1, wherein the feed gas mixture comprises at least 1% helium no more than 0.2% nitrogen.

14. A method of producing an ozone-containing gas comprising:
(a) feeding a feed gas mixture from a feed gas line through a dielectric plasma ozone generator, the feed gas mixture comprising at least 90% oxygen, least 1% of a noble gas, and no more than 0.2% nitrogen;
(b) producing a generator effluent comprising at least 2% ozone from the dielectric plasma ozone generator;
(c) performing an adsorption cycle which comprises repeatedly performing the following steps, in sequence, in each of at least three adsorber vessels, each of the at least three adsorber vessels including an adsorbent having a greater adsorption affinity for ozone than for oxygen or helium:
  (i) feeding the generator effluent through the adsorber vessel and routing gas that exits the adsorber vessel to a recovery line, the recovery line being in fluid communication with the feed gas line;
  (ii) feeding a purge gas through the adsorber vessel and routing gas that exits the adsorber vessel through the recovery line; and
  (iii) feeding a sweep gas through the adsorber vessel and withdrawing from the adsorber vessel a product gas comprising the sweep gas and ozone; and
(d) monitoring a nitrogen level in the recovery line using a nitrogen sensor.

15. The method of claim 14, wherein performing the adsorption cycle further comprises performing the following step in each of the at least three adsorber vessels after step (c)(iii) and before repeating step (c)(i):
(iv) feeding a rinse gas through the adsorber vessel and routing gas that exits the adsorber vessel through a line other than the recovery line, the rinse gas consisting of gas from an oxygen supply that is delivered through a bypass line that is not connected to the helium supply and bypasses the dielectric plasma ozone generator.

16. The method of claim 14, the noble gas consists of helium.

17. The method of claim 15, wherein step (c) further comprises offsetting the performance of steps (c)(i) through (c)(iv) in each of the at least three adsorber vessels so that at least one of the at least three adsorber vessels is always performing step (c)(iii).

18. A method of producing an ozone-containing gas comprising:
(a) supplying a feed gas mixture through a feed gas line to a dielectric plasma ozone generator which produces a generator effluent comprising at least 2% ozone;
(b) subjecting the generator effluent to an adsorption cycle which comprises repeatedly performing the following steps, in sequence, in each of at least three adsorber vessels, each of the at least three adsorber vessels including an adsorbent having a greater adsorption affinity for ozone than for oxygen or helium:
  (i) feeding the feed gas mixture into the adsorber vessel and recovering at least part of the effluent from the adsorber vessel through a recovery line that is in fluid communication with the feed gas line;
  (ii) feeding a portion of the effluent exiting another of the at least three adsorber vessels that is performing the step (b)(iii) through the adsorber vessel and routing the effluent from the adsorber vessel to the recovery line;
  (iii) feeding air through the adsorber vessel to desorb the adsorbed ozone and withdrawing a product gas comprising air and ozone from the adsorber vessel; and
  (iv) feeding a rinse gas consisting of oxygen through the adsorber vessel and feeding the effluent from the adsorber vessel to another one of the at least three adsorber vessels that is performing step (b)(iii), and
(c) maintaining at least 90% oxygen, at least 1% helium and no more than 0.2% nitrogen in the feed gas mixture entering the dielectric plasma ozone generator; and
(d) monitoring the nitrogen level in the recovery line using a nitrogen sensor.

* * * * *